United States Patent [19]
Booth

[11] Patent Number: 5,837,083
[45] Date of Patent: Nov. 17, 1998

[54] METHOD OF FORMING A RIGID TUBULAR BODY

[76] Inventor: John Peter Booth, 36 Moorside Road, Honley, Huddersfield, West Yorkshire, England

[21] Appl. No.: 698,721

[22] Filed: Aug. 16, 1996

Related U.S. Application Data

[63] Continuation-in-part of Ser. No. 288,466, Aug. 10, 1994, abandoned.

[30] Foreign Application Priority Data

Aug. 12, 1993 [GB] United Kingdom .................. 9316776

[51] Int. Cl.⁶ .......................... B29C 63/08; B29C 65/56; B32B 31/16
[52] U.S. Cl. ......................... 156/158; 138/144; 138/150; 138/154; 156/187; 156/189; 156/190; 156/195; 156/294; 285/903
[58] Field of Search ............................. 156/91, 158, 187, 156/188, 189, 190, 191, 195, 294; 138/129, 130, 131, 132, 133, 134, 135, 136, 144, 153, 150, 154; 285/903, 915

[56] References Cited

U.S. PATENT DOCUMENTS

| | | | |
|---|---|---|---|
| 630,635 | 8/1899 | Sundh | 138/131 |
| 747,367 | 12/1903 | Bowley | 138/131 |
| 756,140 | 3/1904 | Reid et al. | 138/134 |
| 768,107 | 8/1904 | Williams | 138/130 |
| 992,259 | 5/1911 | Rubes | 138/135 |
| 1,064,432 | 6/1913 | Berryman et al. | 138/136 |
| 2,640,501 | 6/1953 | Scott et al. | 138/130 |
| 3,771,570 | 11/1973 | Coleman | 138/131 |
| 4,209,043 | 6/1980 | Menzel | 156/187 |
| 4,308,082 | 12/1981 | Menzel | 156/91 |
| 4,903,735 | 2/1990 | Delacour et al. | 138/133 |

FOREIGN PATENT DOCUMENTS

| | | | |
|---|---|---|---|
| 674415 | 11/1963 | Canada | 138/129 |
| 1006320 | 3/1977 | Canada | 156/195 |
| 0136 048 | 4/1985 | European Pat. Off. | F16L 58/06 |
| 420842 | 2/1911 | France | 138/136 |
| 1106128 | 5/1961 | Germany | 138/130 |
| 80884 | 3/1990 | Japan | 285/915 |
| 6-193774 | 7/1994 | Japan | 138/154 |
| 250158 | 8/1947 | Switzerland | 138/154 |
| 610080 | 3/1979 | Switzerland | 285/903 |
| 185161 | 9/1966 | U.S.S.R. | 138/134 |
| 24125 | of 1901 | United Kingdom | 138/133 |
| 729 413 | 10/1955 | United Kingdom . | |
| 739 668 | 11/1955 | United Kingdom . | |
| 833 054 | 4/1960 | United Kingdom . | |
| 1 314 404 | 4/1973 | United Kingdom | F16L 9/16 |
| 1407913 | 10/1975 | United Kingdom | 156/195 |
| 2 088 320 | 6/1982 | United Kingdom | B65H 8/00 |
| 2177062 | 1/1987 | United Kingdom | 156/195 |
| 2280889 | 2/1995 | United Kingdom . | |

*Primary Examiner*—Steven D. Maki
*Attorney, Agent, or Firm*—Adams Law Firm, P.A.

[57] ABSTRACT

A method of forming a hollow elongated or tubular body consisting of the steps of winding one or more strips of material in self-overlapping fashion to produce a multi-layer tubular structure, the or each strip prior to winding being pre-formed to provide a transverse cross-section having at least one step which, in each convolution of the strip accommodates the overlapping portion of the next convolution.

21 Claims, 3 Drawing Sheets

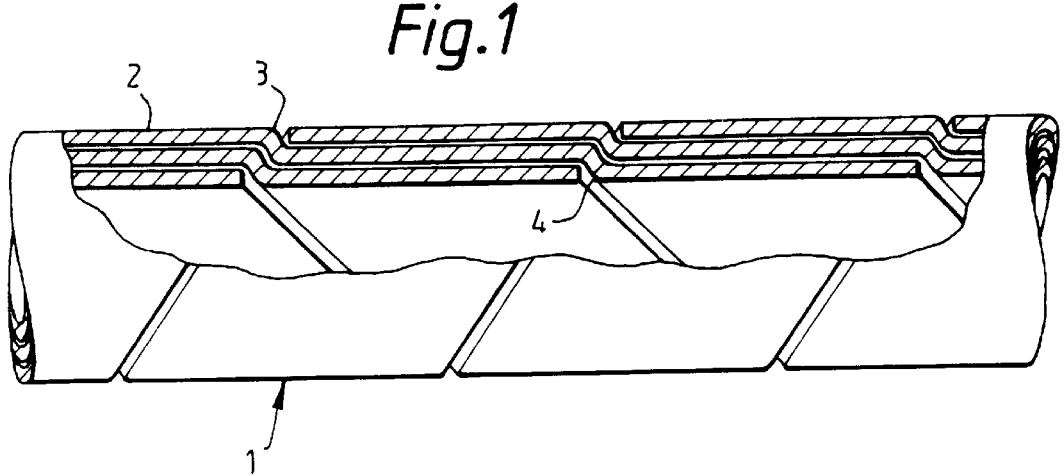
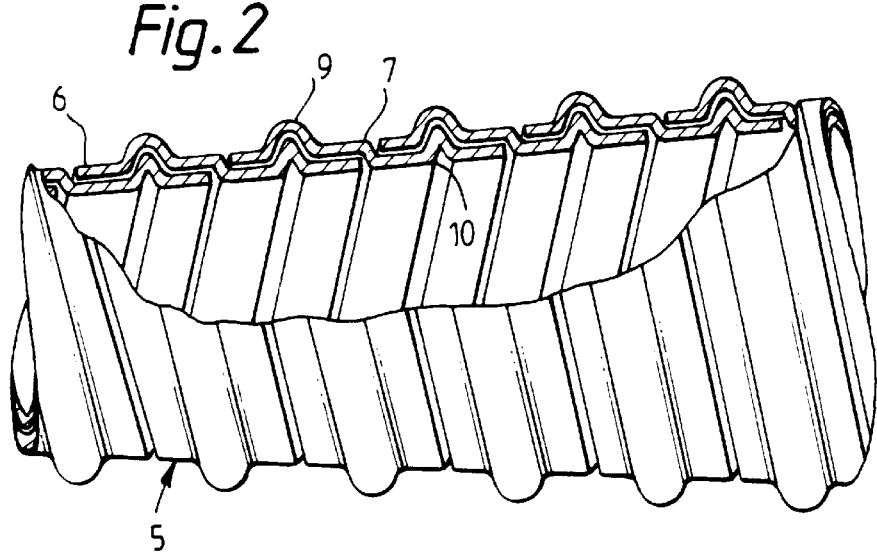

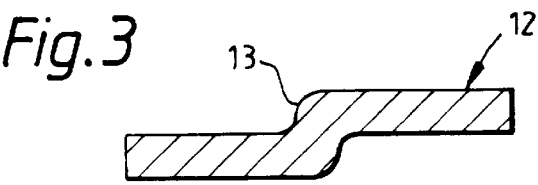
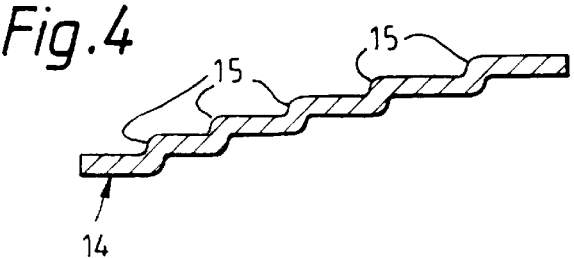
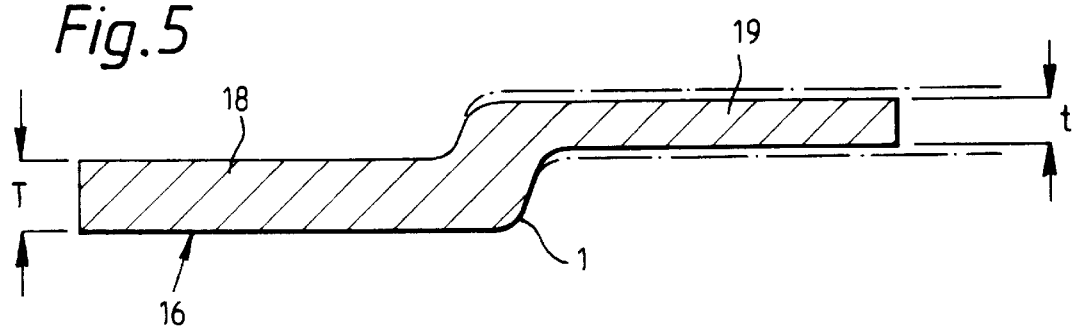
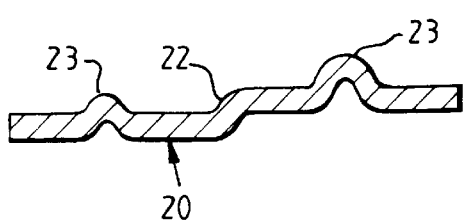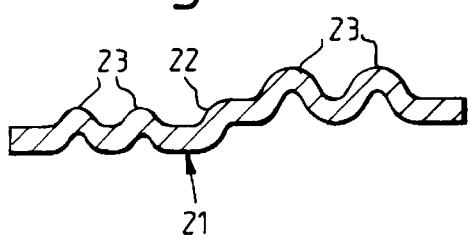

METHOD OF FORMING A RIGID TUBULAR BODY

This application is a continuation-in-part of application Ser. No. 08/288,466, filed Aug. 10, 1994 now abandoned.

This invention relates to hollow elongated or tubular bodies and to the manufacture of tubular bodies of the kind formed by helically winding at least one continuous strip of material in overlapping fashion. Such tubular bodies may be either parallel or tapered or both, in longitudinal cross-section.

Tubular bodies of this kind are already known and an example is described in U.S. Pat. No. 4,657,049 in which metal strips are helically wound in overlapping fashion and embedded in an adhesive matrix to produce a rigid tubular structure. U.S. Pat. No. 3,530,567 also describes a method of forming a tube by helically winding a metal strip in self-overlapping fashion so that the thickness of the wall of the tube at any point is formed from a plurality of laps. In order to remove the helical ridges on the internal bore of the tube formed by the edges of the strip, the laps of the strip material are flattened one against the other after winding by expanding the tubular structure beyond the yield point of the metal strips. Such a procedure presents significant difficulties in manufacture.

According to a first aspect of the present invention, a method of forming a hollow elongated or tubular body comprises helically winding at least one strip of material in self-overlapping fashion to provide a multi-layer tubular structure, the strip being pre-formed to provide a transverse cross-section having at least one step which, in each convolution of the strip accommodates the overlapping portion of the next convolution.

A tubular body having a wall thickness formed of a plurality of laps may thus be continuously made from a single strip of material, the wall thickness generally being one strip thickness greater than the number of steps formed in the cross-section of the strip.

Conveniently, the depth of each step will correspond as a minimum to the thickness of the strip, although it may be significantly greater depending upon the type, if any of bonding medium introduced between the laps. The method may be used to produce tubes which are either parallel or tapered or both in longitudinal cross-section, and in which the edges of the strip do not protrude as helical ridges on the internal or external surfaces of the tube.

The strip may be pre-formed with different thicknesses on either side of a step in order to ensure the correct lay-up during winding, particularly when larger strip thicknesses are being employed. The thickness of the strip may vary progressively across the width and/or one edge of the strip may be made longer than the other, again in order to facilitate correct lay-up during winding.

The inclusion of longitudinal steps in the strip material, in addition to providing the advantages described above, imparts to the tubular body a greater degree of hoop, torsional and longitudinal stiffness than would be the case in the absence of the steps.

Preferably the steps are equally spaced across the width of the strip, or centrally located in the case of a single step, to improve product uniformity and accuracy of continuous winding.

The strip may additionally be pre-formed with stiffening indents or crimps which co-operate with one another on successive convolutions of the strip winding. Such indents or crimps may run longitudinally of the strip or alternatively indents or crimps may be provided running across the width of the strip at a predetermined angle with respect to the longitudinal axis of the strip. Such stiffening indents or crimps can be employed to provide one or more of the following properties or advantages:

a) improved hoop, torsional or longitudinal stiffness;
b) increased axial strength as a result of inter-locking of the stiffening indents or crimps;
c) the stiffening indents or crimps may be introduced at only specific locations along the body of the tube where modified properties are required;
d) the stiffening indents or crimps may provide internal or external projections or recesses, eg helical ribs or grooves in the case of indents or crimps running longitudinally of the strip, which may be used to facilitate the connection of the tube to a coupling or other attachment such as another tube or other component by providing internal or external mechanical coupling.
e) to provide one or more ribs or grooves running longitudinally along, or circumferentially around, the internal or external surface of the tubular body.

The strip material is preferably of metal, such as steel, titanium or aluminium, although other non-metal material such as plastics may also be used.

In its simplest form, the interfacing laps of the strip material may be held together by friction alone, although preferably a bonding medium is used. The bonding medium may also provide a matrix in which the helically wound strip material is completely embedded as a reinforcement and is preferably an adhesive polymer resin such as an epoxy, phenolic, polyester, acrylic or cyano-acrylic resin system. Preferably the strip material is pre-coated with the bonding medium before helically winding to form the tube. The bonding medium may incorporate a filler such as talc, aluminium, mica, glass-fibre or, glass microspheres, and may additionally or alternatively include fabric or fibre reinforcement formed of glass, carbon or boron, polyester, nylon, asbestos or Kevlar (™) fibres.

The tube may additionally be provided with internal and/or external linings, for example to provide additional reinforcement and/or corrosion or abrasion resistance. This may be the case for high pressure or low pressure pipes or tubes subjected to internal or external corrosive or abrasive fluid. Such linings can be achieved by a re-inforced or non-re-inforced polymer resin layer being built onto the inner and/or outer surfaces of the tube, either prior to or on completion of the strip winding operation. Such liners may be manufactured by any of the known methods of construction or a combination thereof such as filament winding, braiding, tape-winding, hand-laminating, pultrusion, pul-winding, or moulding.

For most applications, the tubular body will be of circular cross-section, although it will be appreciated that tubular bodies having other cross-sectional configurations, such as oval or hexagonal, can be produced in accordance with the invention by using suitably shaped mandrels.

The invention in a second aspect also relates to tubular bodies formed by a method in accordance with the first aspect of the invention. Such tubular bodies have a wide range of applications. For example parallel sided tubular bodies in accordance with the invention may be used as pipes and pipelines, both high and low pressure, structural tubes and rocket motor cases. Tapered tubes may be used in golf shafts, aerials, fishing rods, yacht masts, lamp posts and flag poles.

The invention will now be described in greater detail by way of example only, with reference to the accompanying drawings which are not to scale and in which:

FIG. 1 is a schematic longitudinal view, partially cut-away and partially in section, of a first embodiment of a tube constructed according to the present invention;

FIG. 2 is a schematic longitudinal view, partially cut-away and partially in section, of a second embodiment of tube constructed in accordance with the present invention;

Figure 8:
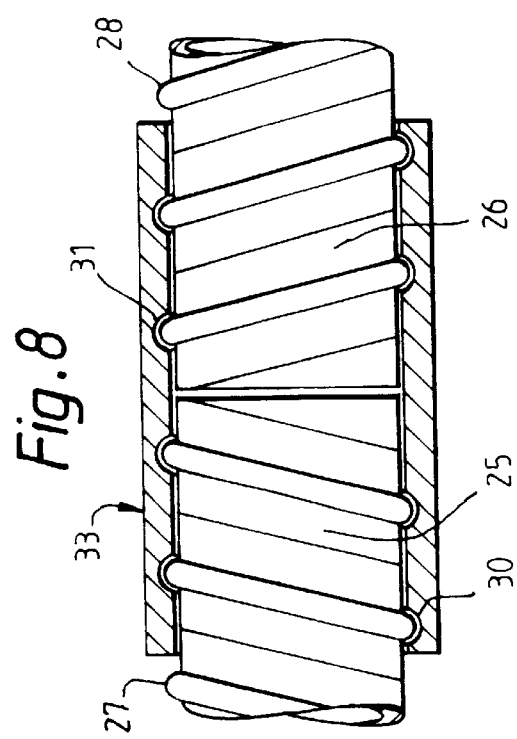
Figure 9:
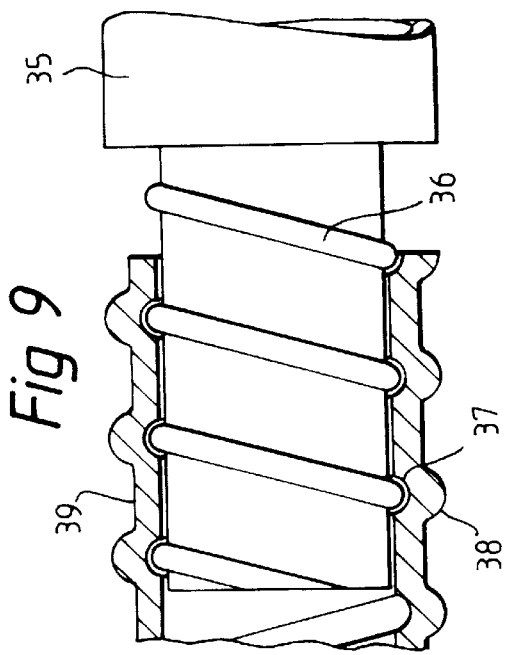
Figure 10:
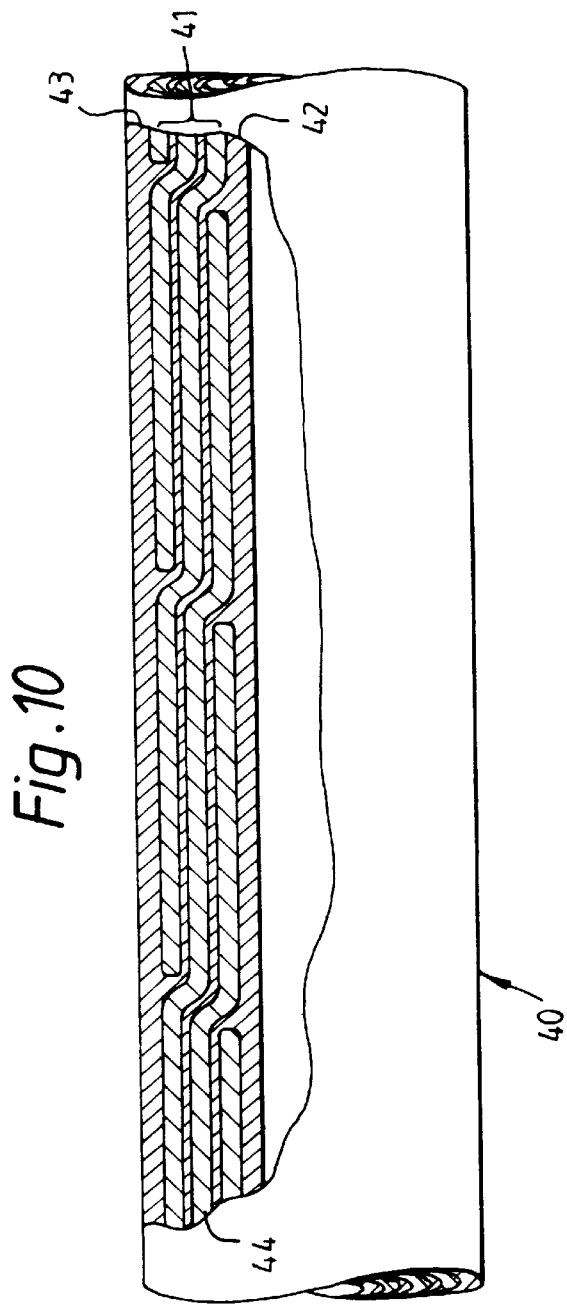

FIGS. 3 to 7 show in schematic form cross-sectional views of strip materials used in the construction of tubes in accordance with the present invention; and FIGS. 8 and 9 show longitudinal schematic views, partly in section, of coupling means for tubes made in accordance with the present invention; and FIG. 10 shows a schematic longitudinal view, partially cut-away and partially in section, of a third embodiment of a tube in accordance with the present invention.

Referring now to FIG. 1, a multi-layer tubular structure 1 is formed from a single steel strip 2 helically wound around a cylindrical mandrel (not shown) in self-overlapping fashion.

The strip 2 is of uniform width and thickness, and is pre-formed with a cross-section having two steps 3, 4 each of a depth corresponding to the thickness of the strip 2. The steps 3, 4 of successive laps or convolutions of the strip 2 are evenly spaced across the width of the strip, and the steps of successive convolutions accommodate the overlapping region of the next convolution of the strip such that the edges of the strip do not project as helical ridges on the internal or external surface of the wound tube as would be the case in the absence of the steps 3, 4.

The strip 2 may be pre-coated with a suitable adhesive bonding medium, such as an epoxy resin, either over its entire surface or on its interlapping surfaces, which is then cured either on or off the mandrel after winding to produce a rigid tube.

In this example, the strip 2 has a thickness of 0.25 mm and a width of 100 mm, the depth or height of the steps 3 corresponding to a little over the thickness of the strip to accommodate a thin layer of adhesive between the laps of the strip. Note that whilst ideally the steps might be formed as right angles to ensure an optimum fit between the steps 3 and the edges of the step 2, in practice the steps 3 will usually be rounded for ease of manufacture.

Although the embodiment of FIG. 1 is shown as a parallel tube, the same strip configuration could be used to form a tapered tube.

Referring now to FIG. 2, this shows a multi-layer tubular structure 5, again formed from a single steel strip 6, except that in this case, the tube 5 is tapered having been wound on a tapered or conical mandrel (not shown), and is formed from a strip 6 having only one step 7 in its cross-section. Furthermore, each tier of the strip 6 on either side of the step 7 is also pre-formed with a respective crimp or indent 9, 10 which runs longitudinally along the length of the strip 6. In successive convolutions, the steps 7 and indents 9, 10 of the strip inter-fit with one another and with the edges of the strip in the manner shown to provide a tapered tube in which the interlocking indents 9, 10 provide additional hoop, tortional and longitudinal stiffness as well as greater axial strength.

It will be apparent that the invention is capable of implementation in a wide variety of different configurations of steps and indents in the strip material, some examples of which are shown in FIGS. 3 to 7.

For example, FIG. 3 shows a schematic cross-section through a strip 12 in its simplest form for use in accordance with the invention having uniform thickness and width and being pre-formed with only a single step 13 in its cross-section. Helical winding of this strip will produce a tube having a wall thickness equivalent to two thicknesses of the strip, and a parallel or tapered tube may be formed by appropriate selection of either a cylindrical or tapered mandrel on which to wind the strip.

FIG. 4 shows a schematic cross-section through a strip 14 having five steps 15 in its cross-section adapted for use in winding a tube having a wall thickness equivalent to six strip thicknesses. Generally speaking, the wall thickness of the tube will correspond to one strip thickness greater than the number of steps formed in the cross-section of the strip.

Referring now to FIG. 5, this shows a schematic cross-section on an enlarged scale through a strip 16 having only a single step 17, but in which the thickness "T" of the strip 16 on one side or tier 18 is greater than the thickness "t" of the other tier 19. This and other variations in strip thickness, for example to provide graduated thickness across the width, and/or along the length of the strip, and/or to provide strips in which one edge is longer than the other, can be achieved using known milling and rolling techniques to facilitate winding of tubes having a variety of desired geometric configurations, and are particularly useful when using strips of larger thicknesses.

Referring now to FIGS. 6 and 7, these show cross-sections through strips 20, 21 having only a single step 22, but formed respectively with single and double indents 23 on either side of the step 22. It will be noted that the tube described with reference to FIG. 2 is wound from a strip having a cross-section as shown in FIG. 6. Evidently, other combinations of steps and indents may be used, and it will be appreciated that the indentation need not be provided along the entire length of the strip, for example where it is intended to provide additional stiffness only along part of the length of a tube.

Tubes wound with strips formed with indentations 2, 3 of the kind illustrated in FIGS. 6 and 7 will produce tubes having internal helical grooves and external helical ribs which can be used to facilitate coupling of the tube to other tubes or external components. Examples of such couplings are illustrated in FIGS. 8 and 9. Referring first to FIG. 8, this shows a coupling for two parallel tubes 25, 26 each formed from strip having a cross-sectional configuration substantially as shown in FIG. 6, but helically wound in opposite senses. The tubes 25, 26 are thus each formed with an external helical rib 27, 28 which provides each of the tubes 25, 26 with a respective external screw thread each being of opposite senses, which engage with respective internal screw threads 30, 31 similarly of opposite senses formed on the internal surface of a hollow coupling member 33. Rotation of the tubes 25, 26 into respective ends of the coupling member 31 serves to positively lock the two tubes together and the coupling can be made permanent by providing adhesive bonding between the internal surface of the coupling member 31 and the external surfaces of the ends of the tubes 25, 26 located therein. Additional sealing means (not shown) may be provided between the ends of the two tubes to provide additional protection.

FIG. 9 shows an alternative coupling arrangement in which a coupling member 35 is formed with an external helical screw thread 36 which co-operates with internal grooves 37 formed by an indent 38 in the strip from which the tube 39 is wound.

The tubular body thereby allows not only an external connection by means of the coupling member 33, but also an internal connection to be effected utilizing the coupling member 35. The convex rib formed on the exterior (concave on the interior) of the tubular body cooperates with the rib of the selected coupling member to form the mechanical part of the connection, and is preferably further strengthened by the use of a bonding medium to form an adhesive bond having improved characteristics.

The coupling members 33, 35 facilitate connection of adjacent tubular bodies in a series. The joint can be made in the field and the mechanical as well as the adhesive connection increases the strength of the joint as it divides the adhesive connection into discrete sections rather than one long adhesive joint. It is found that the strength of such an adhesive connection of a multiplicity of small bands is greater than one long joint of the same length. The use of an internal connection is primarily but not exclusively for use in applications other than in pipeline work.

A joint to repair a damaged portion of an existing pipeline formed from the present tubular body is preferably formed in two halves, i.e. two half cylinders each having complementary grooves to engage the ribs on the tubular body, which are then clamped together around the exterior of the two parts of the pipeline which are on each side of the damaged portion which has been removed. The joint thus provides a mechanical connection and can then be bonded to give an adhesive bond having the improved characteristics referred to above.

It will be appreciated that recesses or projections formed on the surface of the tubular body by other forms of indentations or crimps can alternatively or additionally be used to provide mechanical keying or locking between the tubular body and coupling member or other attachment usually in addition to adhesive bonding.

Whilst tubes constructed in accordance with the present invention can rely exclusively on inter-lap friction as discussed earlier, it is preferred to bond successive laps together using an appropriate bonding medium applied prior to winding, the bonding medium may being applied either as a coat over the entire surface area of the strip, thereby to embed the helically wound strip entirely within the bonding medium, or only to mating surfaces of successive convolutions of the strip.

A continuous method of forming a tubular structure having an internal diameter of 10 mm by a method in accordance with the present invention will now be described.

A coiled metal strip of the desired thickness and width, typically 0.1 mm thick and 12.5 mm wide is pre-treated by any one or more of the following treatments as appropriate, i.e. heat treatment to provide hardening or tempering; de-greasing and surface roughening by shot blasting, abrading or chemical etching to improve adhesion; and silane treatment to provide corrosion protection. Additionally, the strip may be surface coloured at this stage if desired. The pre-treated strip is wound onto a coil from which the strip is passed through one or more sets of pre-forming rollers to apply the appropriate combination of steps, indents and thickness variations to the strip as described above. This may result in a strip which is either straight or which tends to curve or coil due to one edge being longer than the other. The strip passes from the pre-forming rollers through an adhesive application station where adhesive, for example epoxy resin, is applied either to the strip surfaces to be bonded or over the entire surface area of the strip by means of dipping, rolling or spraying or a combination thereof. The end of the strip is then secured to one end of a mandrel having the desired longitudinal cross-section (e.g. tapered or cylindrical) and which is pre-treated with a suitable release film or agent over its entire contact surface.

The mandrel is then rotated and the metal strip is pulled from its coil via the pre-forming rollers and adhesive application station, all of which are mounted on a common coil carriage, and the strip is helically wound onto the mandrel. The coil carriage is arranged to traverse the length of the mandrel in a manner which maintains the correct traverse pitch to mandrel rotation speed to ensure correct overlap during the continuous winding of the pre-formed strip. Consolidation rollers may be used to lay the strip flat to the mandrel and ensure good product consolidation and bonding.

On completion of a traverse of the coil carriage along the length of the mandrel, the strip is severed and the mandrel together with the wound tubular body are placed in an oven in order to cure the bonding resin. The mandrel is then mechanically removed for re-use. Alternatively the mandrel may be separated from the tube prior to curing.

Depending on the application, the tube may be provided internally and/or externally with linings for additional re-inforcement and/or corrosion and/or abrasion protection. This may be provided in its simplest form simply by embedding the entire surface of the helically wound metal strip within a plastics matrix formed from the bonding resin as described above. Where additional protection and/or re-inforcement is required, inner and/or outer linings of polymeric resin, preferably fibre-reinforced, may be provided.

FIG. 10 illustrates such a tubular structure 40 which has an inner core 41, generally similar to the tube described with reference to FIG. 1, provided with internal and external linings 42, 43 respectively. The liners 42, 43 could be formed of metal as well as of plastics material, and could be produced from, for example, a stainless steel strip by the same method of producing the tubular body described above.

The form of each of the linings 42, 43 will depend upon the application for which the tubular structure is intended, and may for example comprise a filament wound fibre reinforced matrix. Such linings may be used where a high integrity lining is required, e.g. for high pressure pipes, or to take advantage of the additional strength provided by such linings.

In the fabrication of such a tubular structure, the inner liner 42 may be pre-formed so as to provide the mandrel upon which the helically wound reinforcing core 41 is wound in a manner earlier described. Alternatively the inner liner 42 may be formed by winding the required resin impregnated reinforcement fibres or fabrics for the liner 42 onto a suitable mandrel, and then winding over the liner 42 a stepped steel strip 44 to produce the reinforcement core 41, followed by winding the required resin impregnated reinforcement fibres or fabrics for the outer liner 43.

Tubular bodies in accordance with the present invention may be formed from more than one strip wound simultaneously or consecutively to produce a number of distinct layers. The strips may be wound at the same or different or opposed helical angles in each of the layers, the layers may be interleaved with other reinforcement materials and the different layers may use different strip materials. Where the strips of successive layers are wound at the same angle they are preferably axially staggered to avoid coincidence between the edges of the strips of successive layers.

The invention may be used to form tubular structures of any dimension subject only to limitations of pre-forming the strip material prior to winding.

I claim:

1. A method of forming a rigid tubular body, comprising:
   (a) providing an elongated strip of material having opposing longitudinal side edges;

(b) forming at least one step in the strip extending longitudinally from one end thereof to the opposite end thereof, each step forming first and second integral and offset tiers collectively spanning the entire width of the strip, and at least one of the first and second tiers having a thickness corresponding generally to the height of the step;

(c) crimping at least one of the first and second tiers to form a raised longitudinal rib and opposing tier sections integrally formed with the rib, and said tier sections residing substantially within the same plane;

(d) helically winding the strip such that the tier forming one side edge of the strip overlaps the tier forming the opposite side edge of the strip, and such that the rib forms a helically-extending internal screw thread on the tubular body; and (e) attaching a coupling at one end of the tubular body for connecting the tubular body together with a second tubular body in a series, said coupling having an external screw thread adapted for mating with the internal screw thread of the first tubular body.

2. A method according to claim 1, wherein the at least one step is formed in a center of the strip.

3. A method according to claim 1, wherein the at least one step comprises a plurality of steps uniformly spaced across the width of the strip.

4. A method according to claim 1, wherein the first and second tiers of the at least one step are of a different thickness.

5. A method according to claim 1, wherein one side edge of the strip is longer at one end thereof than the opposite side edge of the strip to facilitate winding.

6. A method according to claim 1, and comprising the step of applying a bonding medium between engaging surfaces of the coupling and the tubular body for adhesively bonding the coupling and the tubular body together.

7. A method according to claim 1, wherein the strip is formed of metal.

8. A method according to claim 1, wherein the strip is formed of a material selected from the group consisting of steel, titanium, or aluminum.

9. A method according to claim 1, and comprising the step of applying a bonding medium to the tiers forming the respective side edges of the strip prior to helically-winding the strip to form the tubular body.

10. A method according to claim 9, wherein the bonding medium comprises a curable plastics matrix material.

11. A method according to claim 1, wherein one major surface of the strip is completely coated with a plastics matrix material.

12. A method according to claim 1, and comprising the step of forming a lining on an internal surface of the tubular body.

13. A method according to claim 1, and comprising the step of forming a lining on an external surface of the tubular body.

14. A method according to claim 12 or 13, wherein the lining is formed of a fiber reinforced composite material.

15. A method according to claim 1, and comprising the steps of forming an internal lining with the strip material prior to winding, and then forming an external lining over the helically wound strip material.

16. A method according to claim 1, wherein the strip is wound such that the tubular body is tapered along at least part of its length.

17. A method according to claim 1, and comprising the step of winding two or more strips of material one on top of the other to form a wall of the tubular body having two or more layers.

18. A method according to claim 17, wherein the strips are wound at different winding angles.

19. A method according to claim 17, wherein the strips are formed of different materials.

20. A method of forming a rigid tubular body, comprising:

(a) providing an elongated strip of material having opposing longitudinal side edges;

(b) forming at least one step in the strip extending longitudinally from one end thereof to the opposite end thereof, each step forming first and second integral and offset tiers collectively spanning the entire width of the strip, and at least one of the first and second tiers having a thickness corresponding generally to the height of the step;

(c) crimping at least one of the first and second tiers to form a raised longitudinal rib and opposing tier sections integrally formed with the rib, and said tier sections residing substantially within the same plane;

(d) helically winding the strip such that the tier forming one side edge of the strip overlaps the tier forming the opposite side edge of the strip, and such that the rib forms a helically-extending screw thread of the tubular body; and (e) attaching a coupling at one end of the tubular body for connecting the tubular body together with a second tubular body in a series, said coupling having an internal screw thread adapted for mating with the external screw thread of the first tubular body.

21. A method according to claim 20, and comprising the step of applying a bonding medium between engaging surfaces of the coupling and the tubular body for adhesively bonding the coupling and the tubular body together.

* * * * *